(12) United States Patent
Roden et al.

(10) Patent No.: US 6,249,774 B1
(45) Date of Patent: Jun. 19, 2001

(54) METHOD FOR OWNING, MANAGING, AUTOMATICALLY REPLENISHING, AND INVOICING INVENTORY ITEMS

(75) Inventors: Donald R. Roden, Newport Beach; Urs E. Aeberli, Grand Terrace; Peter I. Ruggerello, Irvine; Gloria Venezia, San Dimas; Jadine Y. Yamashita, Diamond Bar, all of CA (US)

(73) Assignee: Bergen Brunswig Corporation, Orange, CA (US)

( * ) Notice: Subject to any disclaimer, the term of this patent is extended or adjusted under 35 U.S.C. 154(b) by 0 days.

(21) Appl. No.: 09/030,882

(22) Filed: Feb. 23, 1998

(51) Int. Cl.[7] .................................................. G06F 17/60
(52) U.S. Cl. .............................. 705/28; 705/28; 705/10; 705/7; 705/8; 364/468.05; 364/468.13
(58) Field of Search ................................. 705/28, 22, 10, 705/7, 8; 364/468.05, 468.13

(56) References Cited

U.S. PATENT DOCUMENTS

| 5,765,143 | * | 6/1998 | Sheldon et al. ........................ 705/28 |
| 5,893,076 | * | 4/1999 | Hafner et al. ......................... 705/28 |
| 5,914,878 | * | 6/1999 | Yamamoto et al. ............ 364/468.13 |

FOREIGN PATENT DOCUMENTS 10-053319 * 8/1996 (JP) .

OTHER PUBLICATIONS

"Databases" Georgia, Bonny, PP 5, Dec. 1997.*
"A, New window on Dun & Bradstreet," Bowman, Sean, PP 1, Jul. 1997.*

"StoreManager 2.0: Online catalogs for the rest of us," Houts, Ean, Apr. 1997.*
"Sears automates parts inventory," Weston, Randy, PP 2, Dec. 1996.*
Esler Bill, Printer's glowing future, pp. 1–6, Sep. 1996.*
Davis Donald, Evolution in EDI, pp. 1–5, Aug. 1995.*
Cachon G et al, Cambell Soup's continous replenishment program: evaluation and enhanced inventory, pp. 1, Sep. 1997.*
Punctuality, if you please, Bournellis Cynthia, pp. 1, Apr. 1995.*

* cited by examiner

Primary Examiner—James P. Trammell
Assistant Examiner—Mussie Tesfamariam
(74) Attorney, Agent, or Firm—Morland C. Fischer

(57) ABSTRACT

A method by which a distributor owns, manages, and automatically replenishes the inventory of a business that is a customer of the distributor. The distributor collects information over a start-up period to reflect an inventory of certain designated items that are supplied by the distributor and sold to consumers by the business. From the information collected, a forecast is projected of the demand for the designated items by consumers following the start-up period. The distributor purchases from the business the inventory of designated items and then invoices the business on a unit of use basis for reimbursement, but only at the time when the designated items are sold to consumers by the business. Depending upon a transaction report electronically transmitted to the distributor, the inventory of designated items dispensed to consumers by the business is automatically replenished by the distributor according to the forecast of demand to enable the business to maintain an inventory of designated items to meet the actual demand of consumers.

20 Claims, 7 Drawing Sheets

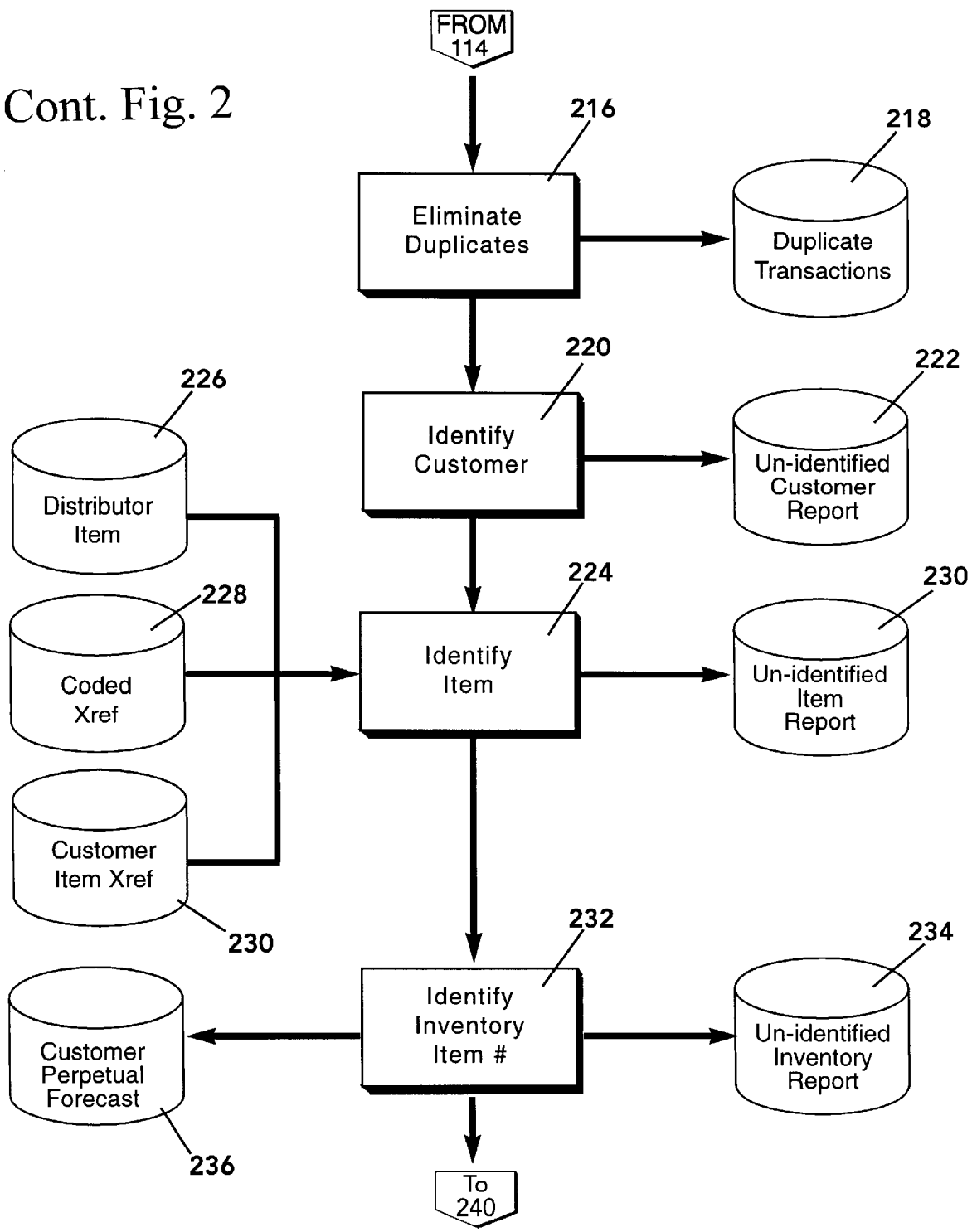
Cont. Fig. 2

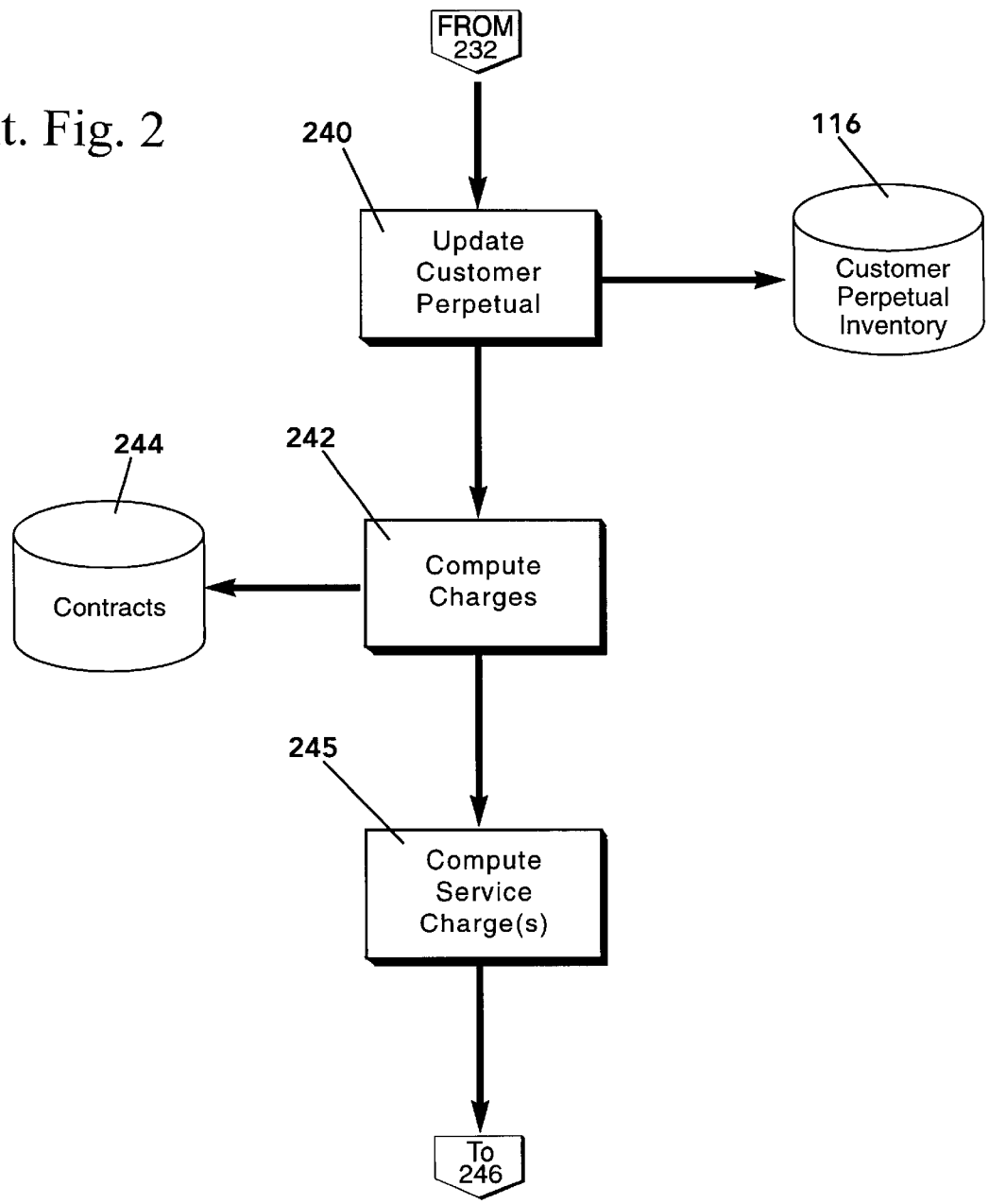
Cont. Fig. 2

Cont. Fig. 2
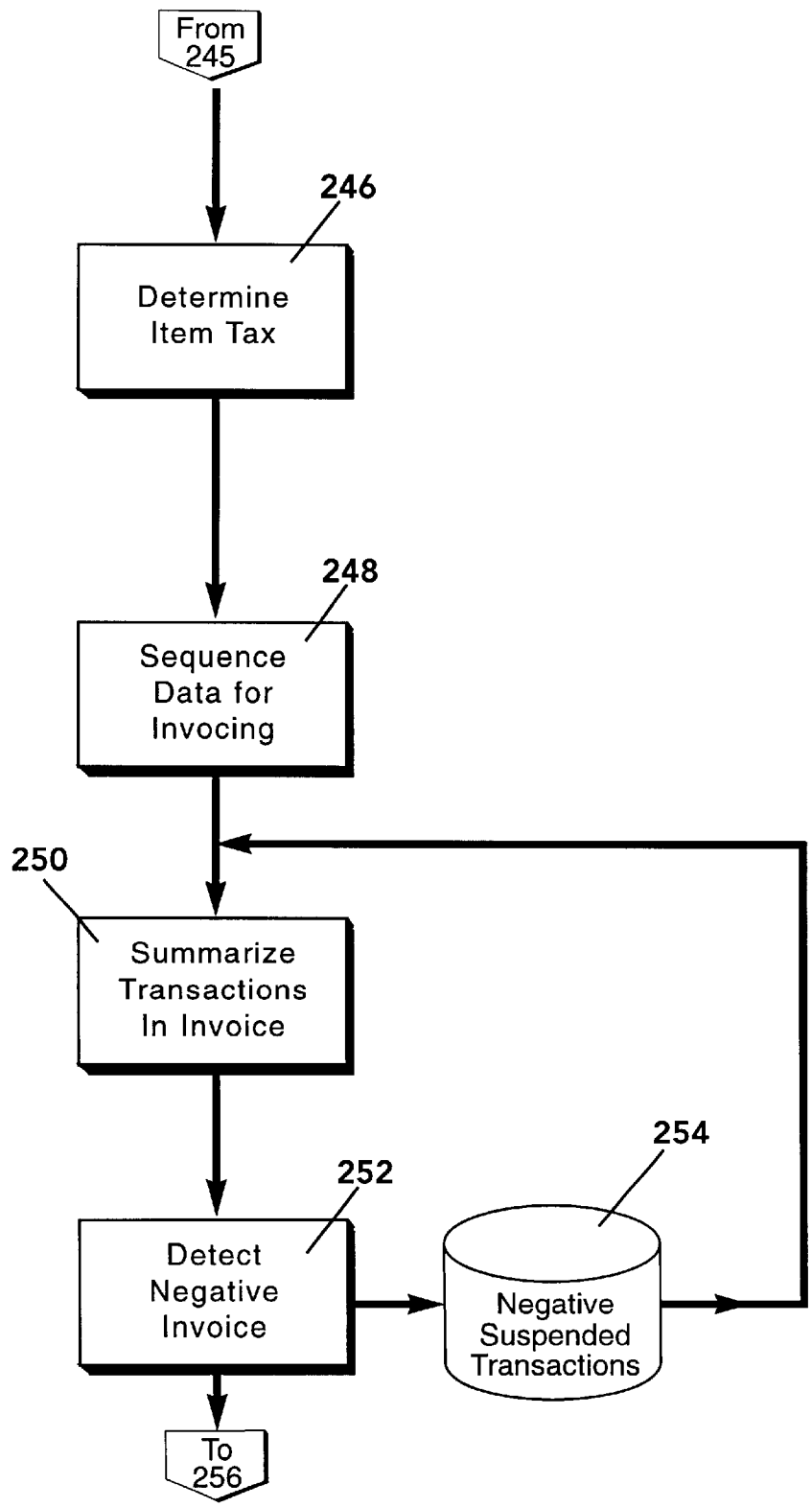

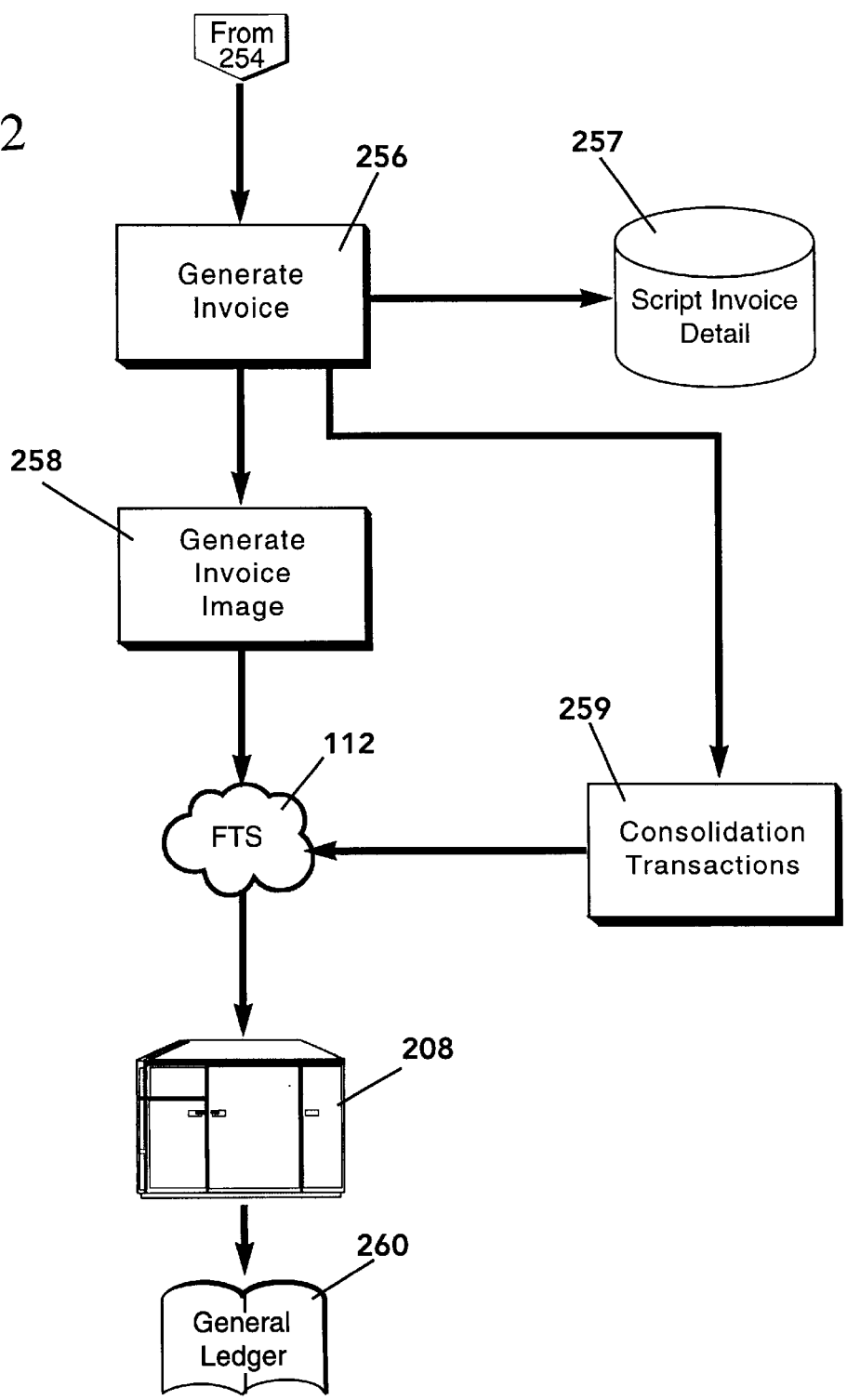

METHOD FOR OWNING, MANAGING, AUTOMATICALLY REPLENISHING, AND INVOICING INVENTORY ITEMS

BACKGROUND OF THE INVENTION

1. Field of the Invention

This invention relates to a method by which a distributor owns, manages, invoices, and automatically replenishes the inventory of a business that is a customer of the distributor so that the customer will not have to advance its own capital to maintain an inventory. The distributor invoices its customer for reimbursement, but only at the time when designated items from the inventory are sold to consumers.

2. Background Art

For small retail and large department and warehouse-type businesses, alike, maintaining an adequate inventory constitutes one of the most significant expenses for staying in business. The purchase of an initial or replenishment inventory, depending upon whether the business is established or new, can tie up operating capital for long periods of time and deny the business the opportunity to make needed improvements, such as expansion, advertising, hiring additional employees, and the like. In addition, a business must typically purchase all of the goods in a shipping container from a distributor even if there is only a small demand for the goods. In the case of a time-sensitive inventory, such as where merchandise is subject to spoilage or loss of efficacy over time, or where styles and consumer taste are known to change quickly, it is highly undesirable to maintain an inventory that cannot be quickly sold to consumers. Otherwise, the business is faced with high carrying costs as well as the possibility of wasting and/or losing its capital investment as a consequence of having to return or dispose of out-of-date merchandise or letting excess merchandise simply sit unsold on its shelves.

What is more, significant amounts of time are often spent by businesses to properly manage and restock their inventory. Otherwise, where a business carries a large number of different items to be sold to consumers, the business cannot always predict with accuracy when to re-order and the quantity of new merchandise required to replace its depleted inventory. Consequently, a new business may be overstocked or run out of inventory that is needed to generate income. In the alternative, the business can pay to have on-site inventory control professionals manage its inventory or leave inventory control to those responsible for delivering new stock. Nevertheless, unless the inventory is frequently inspected, a business may run low of needed items or mistakenly purchase an unnecessarily large supply of already fully stocked items.

Therefore, what is needed is a method by which to more efficiently manage the inventory of a business so as to enable it to reduce unnecessary outlays of capital while providing for the automatic and accurate replenishment of inventory to assure that the shelves of the business are regularly stocked with a suitable number of items based upon anticipated demand, whereby to avoid overstocking or running low of inventory for any prolonged period of time.

SUMMARY OF THE INVENTION

This invention relates to a method for owning, managing, invoicing, and automatically replenishing an inventory of items shipped by a distributor of such items to its customer. The customer and the distributor initially agree on a pool of certain designated items which are to be owned and managed by the distributor on behalf of the customer. After the inventory of designated items is delivered to the customer, it is counted and costed, and a perpetual inventory is established for the customer to enable the distributor to keep track of the identity and value of the designated items on an ongoing basis. At this point, all of the inventory of designated items is purchased from the customer and owned by the distributor. By virtue of the foregoing, the customer will not have to invest its own valuable capital to maintain an inventory needed to stock its shelves.

During a start-up period running for several weeks, information is collected by the distributor relating to the identity and quantity of designated items in the inventory of the customer that are dispensed (e.g. sold) to consumers. The information collected is processed by the distributor using commercially available computer software, and a perpetual forecast of demand for the designated items is established for the customer based upon the customer's history of dispensing the items during the start-up period. At the same time, a minimum or par level is set for each of the designated goods to insure that the customer will not run out of sufficient stock to meet the demand of consumers.

Only at the time when a designated item from the inventory of the customer is sold to a consumer, title to the item passes from the distributor to the customer and the customer is then billed by the distributor for reimbursement. At the same time that a designated item is sold by the customer, a record of the transaction is electronically sent to the distributor's computer where information is stored regarding the identity of the customer, the identity of the item, and the number of items sold. This information is used by the distributor to locate a corresponding item from its own inventory and generate an invoice which reflects each sales transaction as well as the cumulative sales transactions completed over a predetermined billing period (e.g. one day). Of course, the invoice may also reflect the cost of the item, appropriate taxes, and a transaction and shipping charge to cover the services of the distributor. As an important aspect of this method, the customer is billed on a unit of use basis. That is to say, regardless of the total number of items (e.g. antibiotics, bolts, candy, etc.) required to fill a standard container of such items from the manufacturer, the customer is only charged for the precise number of items that have been sold to consumers. This enables the customer to minimize costs and carrying charges.

Transaction information stored in the distributor's computer is also entered in the books of the distributor. Since title passes from the distributor to the customer only when a designated item is sold to a consumer, the distributor's own inventory must be correspondingly decremented. Moreover, the customer's perpetual inventory is instantaneously updated to indicate the sales transaction. Depending upon the customer's history for dispensing such items over time as reflected by the perpetual forecast of consumer demand relating thereto, the distributor will automatically ship (e.g. via truck) from its storage facility a new supply of items to replenish the shelves of the customer, or, if predicted demand is low, wait until the minimum inventory level is reached before additional items are shipped.

DETAILED DESCRIPTION

Figure 1:
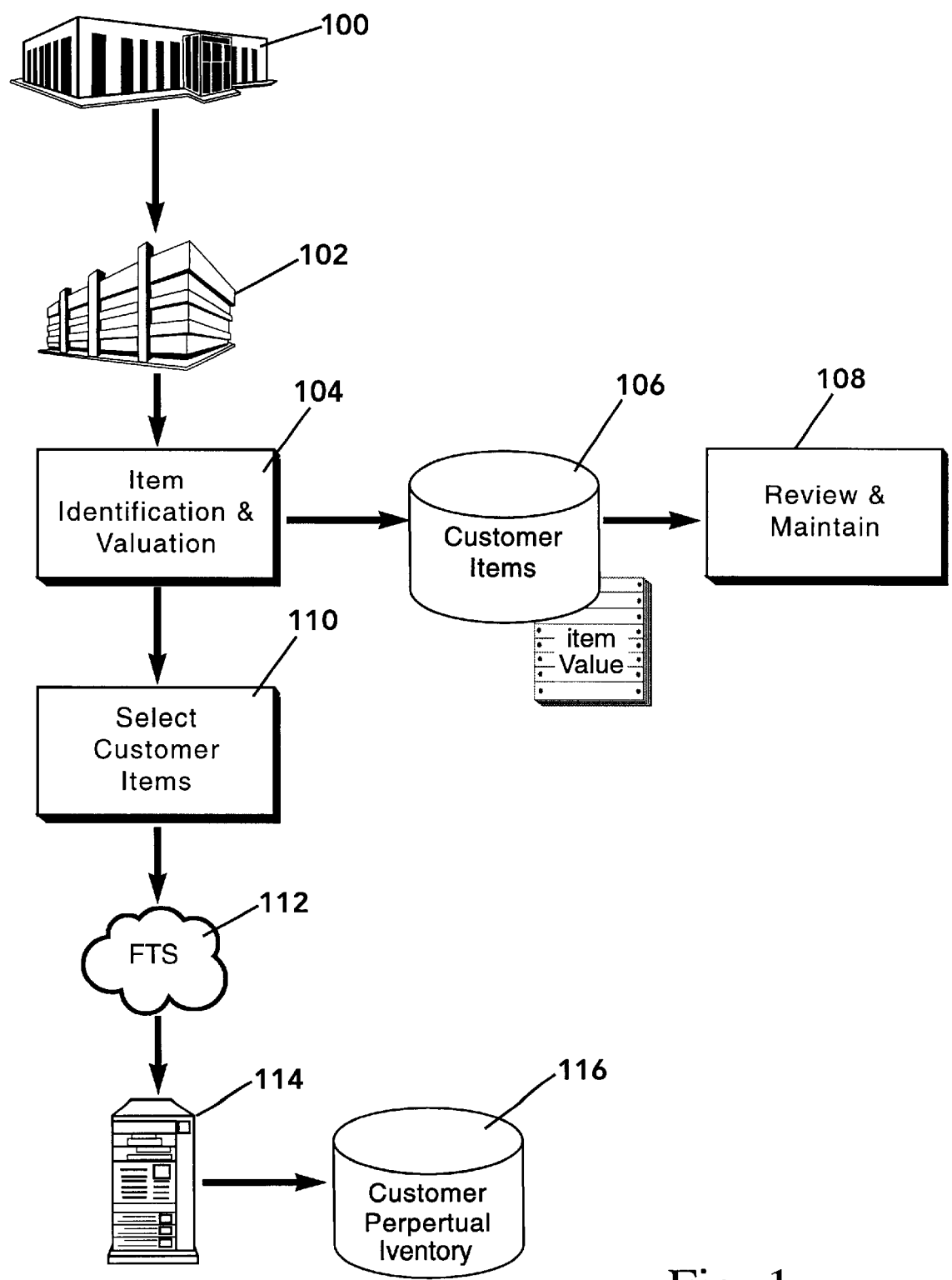
FIG. 1 is a block diagram to illustrate the steps by which a distributor manages an inventory of certain designated items of its customer and creates a perpetual inventory for the customer during an initial start-up period.

The method for managing, invoicing, and automatically replenishing items that are dispensed to consumers from an inventory of such items is described while first referring to FIG. 1 of the drawings. Initially, a new customer 100 (e.g. a pharmacy or a hospital) in need of particular items (e.g. pharmaceuticals) to stock its shelves places an order with a distributor 102 having its own inventory of such items. The distributor makes a determination 104 if the designated items are available from its inventory. The value 106 of the designated items is determined and a report 108 is compiled to identify all of the designated items to be reviewed by the customer and approved by the distributor.

All of the items that are ordered by the customer and available from and approved by the distributor are placed into a pool 110 of designated items that are shipped to the customer to become part of the inventory that will be managed by the distributor on behalf of the customer. The customer then receives an identification number to distinguish it from other customers of the distributor whose inventory is also being managed. All of this information is loaded by way of a conventional file transfer system 112 into a central depository 114, such as a conventional computer (e.g. an IBM AS400) that is located at a distribution site of the distributor.

Based upon the information stored in the central depository computer 114, information for establishing a perpetual inventory 116 of the customer is compiled so as to enable the distributor to keep track of the quantity and value of the pool of items 110 shipped to the customer on an ongoing basis. This information is initially obtained by taking a physical count to determine the identity, number, and value of the designated items at the customer's site (e.g. at the pharmacy which will stock and sell to consumers the items supplied to it by the distributor). The inventory is taken manually by conventional means, such as by using handheld data entry terminals.

The designated inventory items that are supplied by the distributor and sold by the customer are tracked on a daily basis for an initial start-up period (e.g. twelve weeks) in order to establish a history of consumer demand which will be used to create a perpetual forecast (designated 236 in FIGS. 2 and 3) to enable the customer to have its shelves regularly stocked with an ideal inventory at the conclusion of the initial start-up period. At the same time, predetermined minimum or par levels are set to assure that the customer will not run out of sufficient inventory to adequately stock its shelves.

As an important part of the inventory managing, invoicing, and replenishing method which forms this invention, the distributor purchases from the customer and is the owner of all of the inventory of the pool of designated items 110 requested by the customer and approved by the distributor. Title to a designated item does not pass to the distributor's customer until the item is actually sold off the shelf to a consumer. The customer is billed by the distributor for each item sold on a unit of use basis so that the customer will not be charged for any individual item that still remains in inventory and is still the property of the distributor. That is to say, if one of the designated items in the pool of approved items 110 is tablets, the customer will only be billed for the actual number of tablets sold from its inventory despite the fact that the container in which the items are shipped to the customer remains partially full with other tablets to be sold to consumers in the future.

Figure 2:
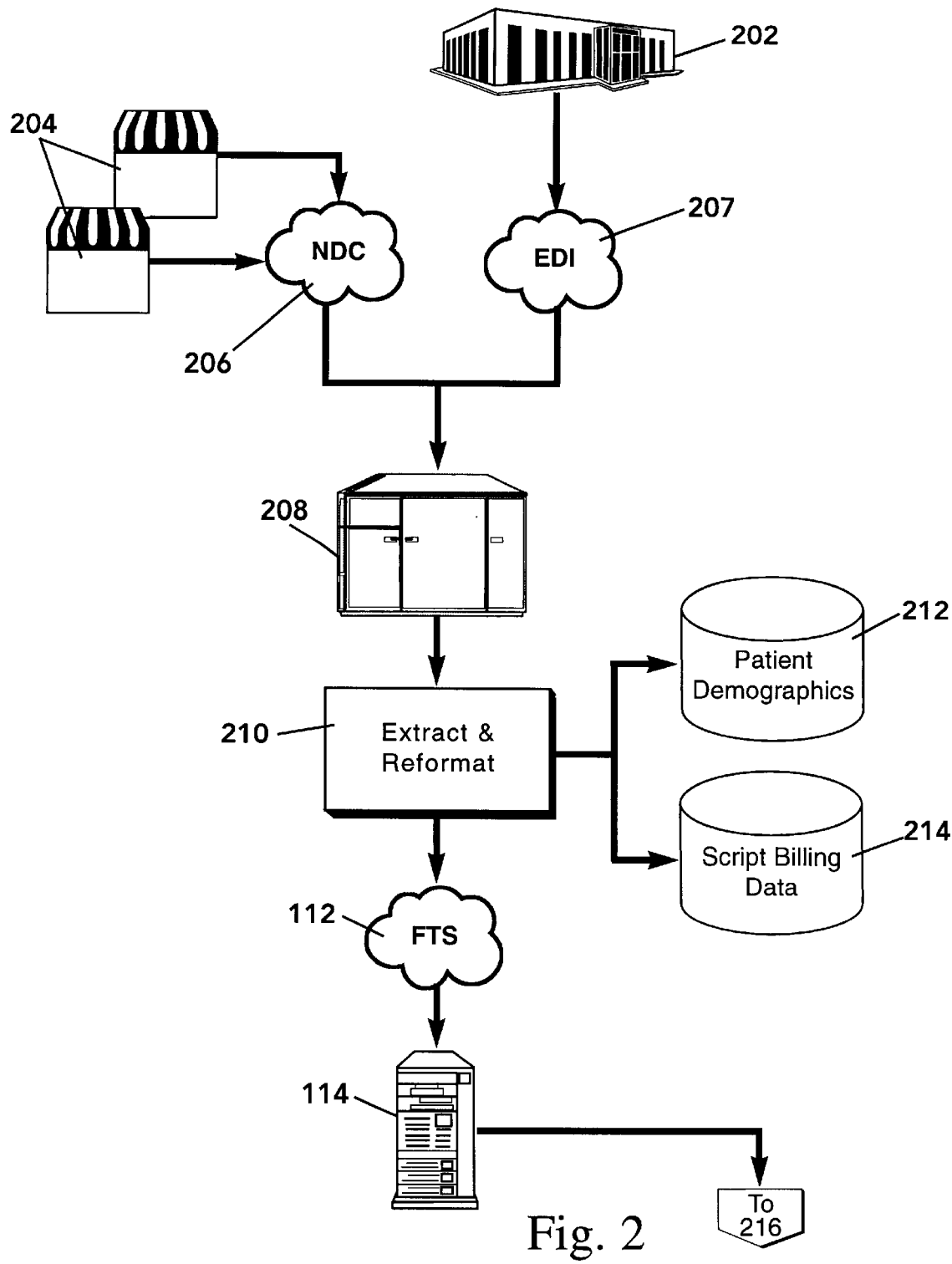
FIG. 2 is a block diagram to illustrate the steps by which the distributor generates an invoice on a unit of use basis to reflect designated items sold from the inventory of the customer to consumers.

FIG. 2 of the drawings illustrates the steps for processing an off-the-shelf sale of a designated item from the pool of items (designated 110 in FIG. 1) requested by the customer and shipped by the distributor to enable the distributor to be reimbursed for its purchase of the items from the customer. By way of example, a monitored transaction or sale occurs in the health care industry at either a managed care site 202 or a retail site 204. A managed care site 202 typically involves relatively large customers of a distributor such as hospitals, health care facilities, and the like, which are usually doctor controlled. A retail site 204 typically involves smaller customers of the distributor, such as independent retail stores (e.g. pharmacies), which are usually driven by doctor prescriptions.

When one of the designated items from the pool of designated and approved items 110 is dispensed to the customer, a label or other transaction indicator is generated to indicate, among other things, the identity of the consumer, the identification number of the distributor's customer, the identification number of the item being dispensed, and the amount (i.e. number of units) of the item being dispensed to the consumer. This information is transferred to the distributor's mainframe computer 208 for processing. In the case of a retail site 204 from which pharmaceuticals are sold, information is usually transmitted to the distributor's mainframe computer 208 by way of a clearinghouse 206, such as that operated by National Data Corporation, which approves prescriptions for reimbursement. In the case of a managed care site 202, information is usually transmitted to computer 208 by means of an electronic data interchange 207.

The mainframe computer 208 of the distributor reformulates all of the information from the different retail and managed health care customers 202 and 204 into a uniform format that can be used by the distributor to produce billing data 210 regarding the customer of the distributor, the item dispensed by the customer, and the number and value of the units dispensed. In this regard, and for purposes of convenience, it may be desirable to separate the information into patient demographics 212 and script billing data 214 which provides line-by-line information of each transaction attributed to the particular managed health care or retail customer 202 or 204 whose inventory is being managed by the distributor.

The reformulated billing data is transferred from the distributor's mainframe computer 208 to its central depository computer 114 (also shown in FIG. 1) by way of file transfer system 112. The central depository computer 114 is responsible for inspecting and processing the billing data in order that each customer may be provided with a suitable invoice which reflects accurate information. In particular, it is desirable to be able to detect and avoid erroneous or double billing by eliminating duplicate entries 216. That is, the data is inspected to verify that the transaction being recorded is not a duplicate in terms of an identical item being dispensed by the same customer to the same consumer. If such a duplicate transaction 218 is detected, it is recorded and eliminated from the billing process.

Provided that the transaction has not been duplicated, a search 220 is made to ensure that the customer is known to and approved by the distributor depending upon the identification number of the customer. If the search 220 cannot identify the customer, the transaction is eliminated from the billing process and a daily report 222 containing the unidentified customer is printed for manual review and correction.

Provided that an original transaction is being processed for a customer that is known to the distributor, a comparison 224 is made to match the identification number of the designated item dispensed by the customer with a corresponding item number of the distributor. That is, an attempt is made to match the identification number of the item from the customer's inventory with the identification number of the same item supplied by the distributor depending, for example, on whether the item identification number used by the customer during the transaction reflects the distributor's own item number 226 or is represented by a special bar-coded number 228 or is represented by a special item number 230 that is used only by the particular customer for its own accounting purposes. In the case where the customer's item number is a bar-coded number 228 or a special number 230, a conversion is required to the distributor's corresponding item number. Should the comparison 224 be unable to match the item number of the customer with the distributor's own item number, a daily report 230 containing the unidentified item number is printed for manual review and correction. The information contained in daily report 230 may also be part of the same daily report 222 which contains the list of unidentified customers.

After the designated item, which has been dispensed by the customer to a consumer and identified in the transmission of information regarding the transaction from the customer's managed health care or retail site 202 or 204, the item must then be identified from the stock of items maintained by the distributor in order to replenish the number of units that has been depleted (i.e. dispensed) from the customer's existing inventory. The foregoing is accomplished by converting the distributor's assigned number 224 for the item to a parent number 232. Such a parent number 232 is necessary to restock the customer's inventory with a generic product whenever possible. For example, if a pharmacy customer dispenses a certain number of units of aspirin of a certain strength, the parent number 232 identifies the particular product without regard to manufacturer. Should no parent number 232 be possible (as in the case where there is no acceptable generic equivalent), then a record is made so that the inventory demand of the customer for a particular item can be tracked on the basis of a distributor's assigned item number 224. In addition, a report 234 is issued for an invalid item when the parent number 232 does not correspond to any identifiable item known to the distributor.

In the event that a parent number 232 can be assigned to the item dispensed by the customer on the basis of the distributor's own item number 224, then the parent number is stored to enable the aforementioned perpetual forecast 236 of the customer to be maintained. The perpetual forecast 236 may be compiled by means of computer software known as SCORE that is commercially available from Supply Chain Solutions of Atlanta, Ga. The perpetual forecast 236 calculates the anticipated demand of the customer for any designated item based upon consumer purchases and the customer's units of use over the initial twelve-week start-up period described while referring to FIG. 1. Accordingly, an ideal inventory level for the customer can be projected which the distributor can regularly maintain (i.e. automatically replenish) to assure that the customer's shelves will be adequately stocked with an item to meet the historical demand therefor. Moreover, the history for the distribution of a designated item is also used to set the minimum or par inventory level.

At this point, an update 240 of the perpetual inventory 116 (also shown in FIG. 1) maintained by the distributor on behalf of the customer is completed. That is to say, and as was earlier described, the distributor purchases and owns all of the designated items on the shelves of its customer prior to the items being dispensed to consumers. When items are sold off the shelves and title passes to the customer, the customer's perpetual inventory 116 is updated to account for the transaction, whereby to reflect an increase in the number of inventory items owned and dispensed by the customer.

The distributor is now ready to compute the charges 242 to its customer depending upon the number of items that had been dispensed during a particular transaction period. By way of example, an invoice will be computed and issued from the distributor to its customer at the conclusion of each business day. However, and as was earlier pointed out, the charges 242 are computed on a unit of use basis at the lowest unit of consumption. In other words, the customer is charged for only the actual number of individual items (e.g. aspirins) that are dispensed during a given day, regardless of how many items are required to completely fill a container for such items that sits on the customer's shelf. Contractual agreements 244 between the distributor and its customer which indicate a predetermined price per unit dispensed are factored into the computation. In addition, the distributor's service charge 245 and shipping charges are also added to the charges 242. The service charge 245 which is also dependent upon the contractual understanding 244 between the distributor and its customer enables the distributor to be compensated for owning, managing, and replenishing the customer's inventory as has been and will be described. Lastly, all appropriate state and local taxes 246 are computed for the items dispensed.

The distributor is now ready to create a daily invoice to the customer to indicate the identity of the customer and the items dispensed, whether the items are prescriptions or sold over the counter, the cost of the number of items dispensed, the distributor's service charge, and the appropriate taxes. The composite billing data 248 that reflects the aforementioned information is summarized and sequenced into a format 250 according to the wishes of the customer.

As is customary in some billing procedures, negative transactions 252 are detected and transferred to storage 254 where they are temporarily suspended. That is to say, consumers may return designated items to the customer of the distributor. When the item or items are returned to the shelves of the customer, the customer may be entitled to a credit against a prior invoice issued by the distributor for the same item or items. This negative billing data is held in storage 254 so as to be included with the composite billing data 248 of the following day or some subsequent day when sufficient numbers of items are sold to reflect a positive billing transaction.

Provided that the composite billing data 248 reflects a positive transaction for at least one designated item, then an invoice 256 to the customer is printed by the distributor. The invoice 256 provides a summary of the cumulative transactions to show totals for all items sold broken down by prescriptions and over-the-counter items. An additional report 257 may also be provided to the customer to list line item or script transactions covering each item dispensed to consumers. The list of individual and composite transactions to the customer are combined into consolidated billing data 259 and transmitted to the mainframe computer 208 of the distributor via file transfer system 112 for archival purposes. At the same time, a digital image 258 of the daily invoice 256 is sent electronically to the customer for its own convenience in record keeping and to help reconcile the printed invoice 256 which is sent by post. The digital image 258 is also transmitted to the mainframe computer 208 of the distributor for storage.

The consolidated billing data 259 stored in mainframe computer 208 is then used by the distributor for its own record keeping purposes. More particularly, the general ledger 260 of the distributor is decremented to show a decrease in the amount of distributor-owned inventory. Moreover, the accounts receivable of the distributor is increased to reflect the charges owed by the customer pursuant to its invoice 256. Lastly, credits from the total invoice 256 may be posted to any divisions or subsidiaries of the distributor who are responsible for providing to the distributor's customer the inventory of designated items that has been dispensed to consumers for which the customer has now been charged.

Figure 3:
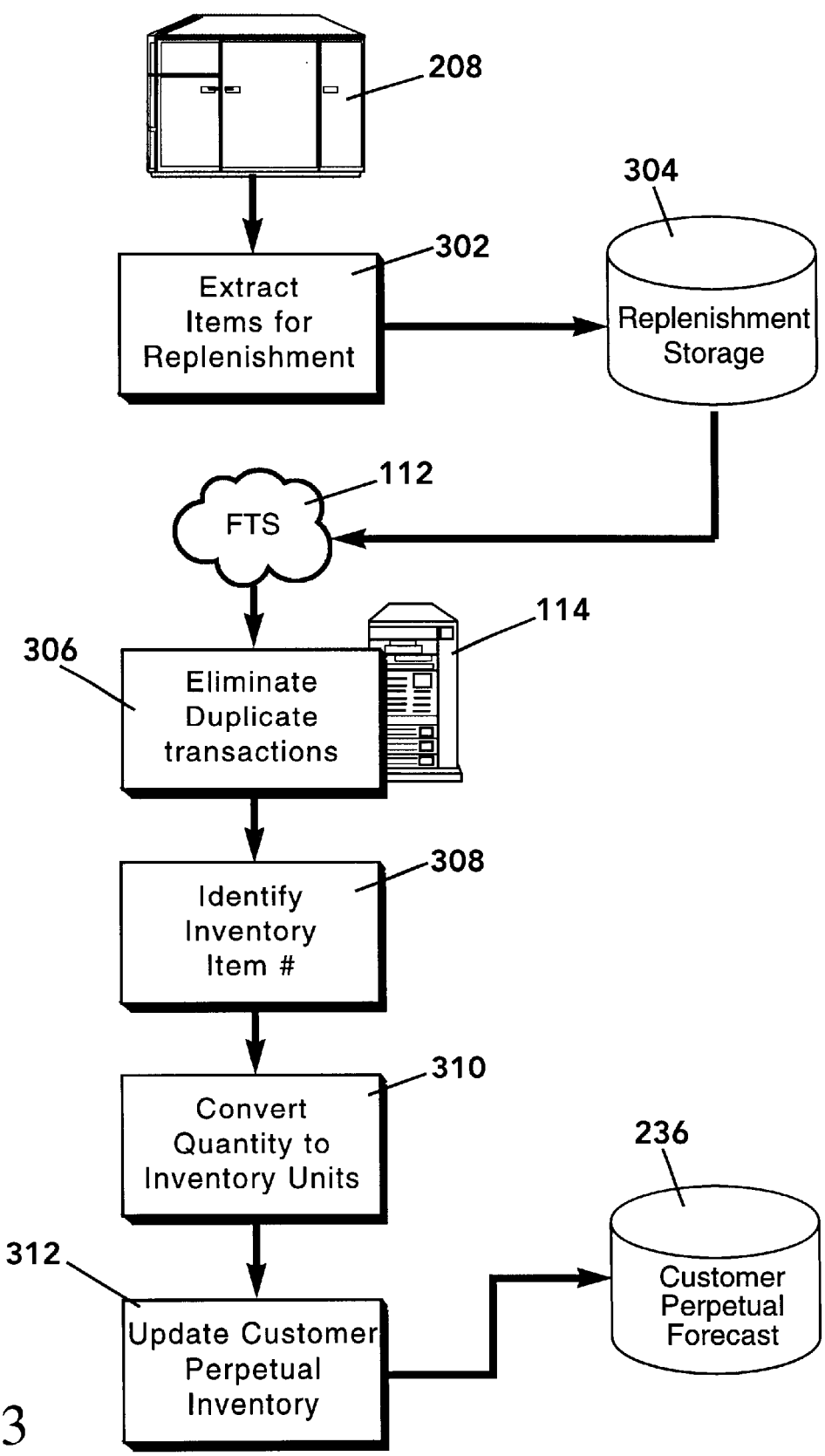
FIG. 3 is a block diagram to illustrate the steps by which the distributor automatically replenishes the inventory of designated items that have been sold by the customer to consumers.

Turning now to FIG. 3 of the drawings, the method of owning, managing, and replenishing inventory items includes a step of automatically replenishing the shelves of the managed care and retail customers (designated 202 and 204 in FIG. 2) of the distributor to replace the items that have been dispensed to consumers. That is, and depending upon the customer's history of dispensing designated items to consumers over time, for any of the pharmaceutical or over-the-counter items which have been dispensed on a given day and for which the customer has been charged in its daily invoice (designated 256 in FIG. 2), a suitable number of replacement items will be automatically shipped to the customer so that its shelves may be restocked without any action or management required on the part of the customer. However, and in some cases to be explained below, the distributor may not immediately deliver a new supply of items to the customer to replenish its inventory.

As was previously disclosed while referring to FIG. 2, the mainframe computer 208 of the distributor stores consolidated billing data 259 that comprises a list of the cumulative and individual transactions appearing on the invoice and statement 256 and 257 of the customer. From this consolidated data 259, the designated items 302 that are part of the inventory management and replenishment method are extracted from storage. More particularly, and as was earlier indicated, only certain pre-approved items from the inventory of the customer will be eligible for coverage by the distributor. While the customer's invoice may contain a listing of both designated and non-designated items, only the designated items of the customer will be automatically replenished by the distributor. The remaining items will be subject to conventional billing, and conventional replenishment requests must be initiated by the customer. Once the list of designated items is extracted, the corresponding information is stored so that a record 304 can be kept of each new transaction.

This same information is transmitted to the computer 114 at the warehouse site where one or more of the designated items to be replenished are held in the inventory of the distributor. Computer 114 completes an examination 306 of the information so as to eliminate duplicate transactions and assure that the customer will not be sent any items other than those actually needed to replenish its inventory for a given period of time. The examination 306 to eliminate duplicates takes into account the customer's history of prior transactions for the same items during the same billing period.

Next, information 308 relating to a designated item to be replenished including the distributor's item number and quantity are determined. From the information 308, a conversion is made from whole dispensing units to units of use. Such conversion relies upon a standard industry reference such as that available from First Data Bank. For example, a bottle containing 100 ml of liquid may be converted into 100 dispensing units so that the customer's inventory may be replenished on a unit of use basis depending upon the needs of the customer and its history of dispensing the items. However, the customer's inventory is replenished by rounding up to the next wholesale unit that is commercially available to at least meet the minimum inventory level requirements of the customer. For example, if the customer dispensed 80 ml of liquid during a billing period and standard shipping containers have 100 ml of liquid, then the customer's inventory will be replenished with 100 ml of liquid.

An update 312 is now made of the customer's perpetual inventory (designated 116 in FIGS. 1 and 2). Being that additional items are sent to the customer, its inventory of such items is changed to enable the distributor to track the new shipment of inventory and the distributor's investment therein. In this regard, additional inventory is typically shipped to the customer on either a daily or on an as-needed basis depending upon the forecast of consumer demand, the minimum inventory levels of the customer, and new transactions recorded in the daily invoices that are prepared and sent from the distributor to the customer. The shipment may be by way of any available transportation means, such as a truck, or the like.

Lastly, the update 312 of the customer's perpetual inventory 116 is also used to correspondingly update the customer's perpetual forecast 236 (also shown in FIG. 2). As was previously described, commercially available computer software is used to accurately predict the quantity and schedule of replenishment items to be shipped to the customer. The forecast is determined by knowing the daily on-hand inventory level of the customer based upon billing transactions, the minimum inventory of items required by the customer to adequately stock its shelves, and the anticipated demand of the customer based on the distribution history and the number of items shipped to the customer in the past. Therefore, when the customer regularly dispenses few designated items during a given day such that anticipated demand is low, a replacement supply of such items may not be shipped by the distributor until the predetermined minimum inventory level is reached. On the other hand, where the customer's history over time shows that a large number of a designated item is regularly distributed whereby demand is high, a customer's inventory may be automatically replenished on the following day.

Although examples for applying the method for owning, managing, and automatically replenishing inventory items have been described in terms of customers of the distributor from the health care industry, it is to be expressly understood that such examples are not to be regarded as a limitation of this invention. The method herein described is also applicable to other businesses that are characterized by a large inventory of items to be sold to consumers and then restocked, such as items found in hardware stores, grocery stores, department stores, to name but a few, where a large capital investment would typically be required on the part of the business to purchase and maintain its inventory.

We claim:

1. A method for managing and replenishing the inventory of a business by a distributor, said method comprising the steps of:

collecting and recording information over an initial period of time to reflect the quantity and value of an inventory of certain designated items supplied by the distributor and dispensed to consumers by the business;

processing the information recorded during said initial period of time to project a forecast of the demand for the designated items by consumers following said initial period of time based upon how many of the designated items are dispensed to consumers during said initial period of time;

purchasing the inventory of designated items from the business and invoicing the business for reimbursement when the designated items owned by the distributor are dispensed to consumers by the business; and automatically replenishing the designated items dispensed to consumers by the business according to said forecast of demand so that the business maintains an inventory of the designated items to meet the actual demand of consumers.

2. The method recited in claim 1, including the additional step of invoicing the business on a unit of use basis, such that the business is charged by the distributor for individual ones of said designated items maintained in the inventory of the business and purchased by the distributor, but only if said individual items have first been dispensed to consumers.

3. The method recited in claim 1, wherein the business electronically transmits a transaction report to the distributor to indicate that at least one of the designated items purchased by the distributor from the inventory of the business has been dispensed to consumers, the distributor processing the transaction report from the business to invoice the business so that the distributor will be reimbursed for said designated items dispensed.

4. The method recited in claim 3, including the additional step of processing the transaction report and recording the number and value of replacement designated items supplied to the business by the distributor to replenish the inventory of designated items dispensed to consumers so that the distributor can keep track of the quantity and value of said replacement designated items in the inventory of the business.

5. The method recited in claim 3, wherein the transaction report transmitted to the distributor also identifies the business, the quantity of said designated items dispensed by the business to consumers, and the identity of the consumers to whom said designated items have been dispensed.

6. The method recited in claim 3, including the additional step of processing the transaction report from the business to identify and eliminate duplicate transactions indicative of the same designated items being dispensed to the same consumers at the same time.

7. The method recited in claim 3, including the additional step of processing the transaction report from the business to identify in the inventory of the distributor replenishment items that correspond to said designated items dispensed to consumers by the business.

8. The method recited in claim 3, including the additional step of processing the transaction report from the business to distinguish said designated items dispensed by the business from any non-designated items in the inventory of the business but not purchased by the distributor.

9. The method recited in claim 3, including the additional step of processing the transaction report from the business to determine the quantity of said designated items dispensed by the business to consumers and the quantity of said designated items required to replenish the inventory of the business and the frequency at which the inventory should be replenished depending upon said forecast of demand for said designated items.

10. The method recited in claim 3, including the additional step of processing the transaction report from the business and updating said forecast of demand for said designated items after said initial period of time depending upon the quantity of said designated items dispensed by the business to consumers and the frequency at which said designated items have been dispensed.

11. A method for managing and replenishing the inventory of a business by a distributor, said method comprising the steps of:

collecting and recording information over an initial period of time to reflect the quantity and value of an inventory of certain designated items supplied by the distributor and dispensed to consumers by the business;

processing the information recording during said initial period of time to project a forecast of the demand for the designated items by consumers following said initial period of time based upon how many of the designated items are dispensed to consumers during said initial period of time;

purchasing and owning the inventory of designated items from and at the site of the business by the distributor;

electronically transmitting a transaction report from the business to the distributor, wherein said transaction report indicates that at least some of the designated items purchased by the distributor from the inventory of the business have been dispensed to consumers by the business;

processing the transaction report by the distributor to identify in the inventory of the distributor replenishment items that correspond to the designated items which have been dispensed to consumers by the business;

invoicing the business by the distributor so that the distributor will be reimbursed for the designated items which have been dispensed to consumers by the business; and automatically replenishing the designated items dispensed to consumers by the business according to said forecast of demand so that the business maintains an inventory of the designated items.

12. The method recited in claim 11, wherein the business is invoiced by the distributor on a unit of use basis, such that the business is charged by the distributor for individual ones of said designated items maintained in the inventory of the business and purchased by the distributor, but only if said individual items have first been dispensed to consumers.

13. The method recited in claim 11, including the additional step of recording the number and value of designated items supplied to the business by the distributor to replenish the inventory of designated items dispensed to consumers so that the distributor can keep track of the quantity and value of said replacement designated items in the inventory of the business.

14. The method recited in claim 11, wherein the transaction report transmitted from the business to the distributor identifies the business, the quantity of said designated items dispensed by the business to consumers, and the identity of the consumers to whom said designated items have been dispensed.

15. The method recited in claim 11, wherein the step of processing the transaction report from the business by the distributor includes identifying and eliminating duplicate transactions indicative of the same designated items being dispensed to the same consumers at the same time.

16. The method recited in claim 11, wherein the step of processing the transaction report from the business includes distinguishing the designated items dispensed by the business from any non-designated items in the inventory of the business but not purchased by the distributor.

17. The method recited in claim 11, wherein the step of processing the transaction report from the business includes determining the quantity of the designated items dispensed by the business to consumers and the quantity of the designated items required to replenish the inventory of the business and the frequency at which the inventory should be replenished depending upon said forecast of demand for the designated items.

18. The method recited in claim 11, including the additional step of updating said forecast of demand for the designated items after said initial period of time depending upon the quantity of designated items dispensed by the business to consumers and the frequency at which the designated items have been dispensed.

19. A method for managing and replenishing an inventory of items of a business by a distributor, said method comprising the steps of:

purchasing and owning the inventory of items from and at the site of the business by the distributor;

electronically transmitting a transaction report from the business to the distributor, wherein said transaction report indicates that at least some of the inventory items purchased by the distributor from the business have been dispensed to consumers by the business;

processing the transaction report by the distributor to identify in the inventory of the distributor replenishment items that correspond to the inventory items which have been dispensed to consumers by the business;

invoicing the business by the distributor on a unit of use basis so that the distributor will only be reimbursed for individual ones of the inventory items which have actually been dispensed to consumers by the business, whereby ownership of the individual inventory items dispensed by the business will pass to the business; and replenishing the inventory items dispensed by the business from the inventory of the distributor.

20. The method recited in claim 19, including the additional steps of:

collecting and recording information over an initial period of time to reflect the quantity and value of the inventory items purchased by the distributor and dispensed to consumers by the business;

processing the information recorded during said initial period of time to project a forecast of the demand for the inventory items by consumers following said initial period of time based upon how many inventory items are dispensed to consumers during said initial period of time; and replenishing from the inventory of the distributor the inventory items dispensed by the business according to said forecast of demand so that the business maintains a supply of the inventory items to meet the actual demand of consumers.

* * * * *